United States Patent Office 3,152,111
Patented Oct. 6, 1964

3,152,111
TRIAZINONE DYESTUFFS
David Taber, Pittsburgh, Pa., assignor to American Aniline Products, Inc., a corporation of Maryland
No Drawing. Filed Dec. 18, 1961, Ser. No. 160,234
5 Claims. (Cl. 260—153)

This invention relates to new dyestuffs and to the coloration of cellulosic and other textile materials therewith. In one specific aspect, it relates to new water-soluble dyestuffs containing a triazinone ring to which there are attached two hydroxymethyl groups.

In recent years there has been considerable interest in the manufacture of water-soluble dyestuffs containing triazine or pyrimidine rings to which there are attached reactive halogen atoms. These classes of dyestuffs are believed to react with the functional groups of cellulosic and other fibers and, as a result, give colorations which are extremely resistant to wet treatments. No dyestuffs have been heretofore described which contain a hydroxymethyl-substituted triazinone ring affixed to a dyestuff moiety.

I have found that unexpectedy superior water-soluble dyestuffs can be made from water-soluble dyestuffs containing a primary amino group by converting the primary amino group to a hydroxymethyl-substituted triazinone ring. My new dyestuffs, when applied to cellulose or other textiles by dyeing or printing in the presence of an acidic catalyst, give bright colorations which have good wash fastness.

It is therefore an object of the present invention to provide a new class of water-soluble dyestuffs containing a hydroxymethyl-substituted triazinone ring.

In accordance with the invention, I have discovered dyestuffs of the formula:

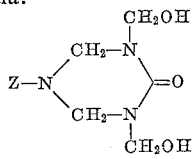

wherein Z is a water-soluble colored moiety of the azo, anthraquinone, phthalocyanine or nitro series, as recognized by the Colour Index, 2nd Edition, 1956. The dyestuff moiety is solubilized by the presence thereon of one or more ionogenic solubilizing groups such as sulfonic acid or carboxylic acid groups.

The new dyestuffs are made by the interaction of one mole of a water-soluble primary amine of the azo, anthraquinone, phthalocyanine or nitro series with at least two moles of formaldehyde and one mole of urea to form a dyestuff having a triazinone ring attached thereto. This intermediate is reacted with at least two additional moles of formaldehyde to form the dyestuffs of the invention.

The primary amino colorants of the azo series which are suitable for making the dyestuffs of the invention can be made in a variety of ways. One effective method is the diazotization of an aromatic primary amine and the coupling of the resultant diazonium compound with a coupling component containing a primary amino group which, after the coupling operation, remains free to react. Either the aromatic primary amine or the coupling component must contain at least one ionogenic solubilizing group.

Suitable aromatic primary amines which may be used to form the amino azo compounds include, but are not limited to, aniline, o-, m- and p-chloroanilines, o-, m-, and p-toluidines, o-, m- and p-anisidines, 2,5-dichloroaniline, α- and β-naphthylamine, 2,5-dimethylaniline, 5-nitro-2-aminoanisole, 4-aminodiphenyl, aniline-2-, -3- and -4-carboxylic acids, 2-aminodiphenyl ether, 2-, 3- or 4-aminobenzenesulfonamide, dihydrothio-p-toluidine monosulfonic acid, dihydrothio-p-toluidine disulfonic acid, aniline-2-, -3- and -4-sulfonic acids, aniline-2,5-disulfonic acid, 2,4-dimethylaniline-6-sulfonic acid, 3-aminobenzotrifluoride - 4 - sulfonic acid, 4-chloro-5-methylaniline-2-sulfonic acid, 5-chloro-4-methylaniline-2-sulfonic acid, 3-acetylaminoaniline-6-sulfonic acid, 4-acetylaminoaniline-2-sulfonic acid, 4-methylaniline-2-sulfonic acid, 4-chloroaniline-2-sulfonic acid, 3,4-dichloroaniline-6-sulfonic acid, 3-methylaniline-6-sulfonic acid, 2,4-dimethoxyaniline-6-sulfonic acid, 4-methoxyaniline-2-sulfonic acid, 1-naphthylamine-2-, -5-, -6- and -7-monosulfonic acids, 1-naphthylamine-3, 6-disulfonic acid, 2-naphthylamine-5,7-disulfonic acid, 2-naphthylamine-3,6,8-trisulfonic acid, m- and p-nitroaniline, 4-nitroaniline-2-sulfonic acid, 3-nitroaniline-6-sulfonic acid, m- or p-aminoacetanilide and 4-amino-2-acetylaminotoluene-5-sulfonic acid.

Among the suitable coupling components are 2-amino-5-naphthol-7-sulfonic acid, 2-amino-8-naphthol-6-sulfonic acid, 1-amino-8-naphthol-6-sulfonic acid, 2-amino-5-naphthol-3,6-disulfonic acid, 2-amino-8-naphthol-3,6-disulfonic acid, 2-amino-5-naphthol-4,6-disulfonic acid, 2-amino-8-naphthol-4,6-disulfonic acid, 1-amino-8-naphthol-4,6-disulfonic acid, aniline, o- and m-anisidines, o- and m-toluidines, 2,5-dimethoxyaniline, 1-(3- or 4-aminobenzoylamino)-8-naphthol-3,6- and 4,6-disulfonic acids, 1-(3-aminophenyl)-3-methyl-, -carboxy-, and -carbethoxy-5-pyrazolones, and 1-(4-aminophenyl)-3-methyl-, -carboxy-, and -carbethoxy-5-pyrazolones.

The primary amino azo colorants used in the invention also include those containing more than one azo group. Useful disazo compounds may be formed by the tetrazotisation of an aromatic diamine containing two primary amino groups and coupling the tetrazo compound thus formed with two moles of one of the above-defined coupling components or with one mole of each of two of the above-defined coupling components or with one mole of one of the above-defined coupling components and one mole of a coupling component having no amino group. The aromatic diamine or the coupling component (or at least one of the coupling components when two different coupling components are used) must contain at least one ionogenic solubilizing group. Suitable aromatic diamines include, but are not limited to, benzidine, 3,3'-dimethoxybenzidine, benzidine-2,2'-disulfonic acid, benzidine-3,3'-dicarboxylic acid, benzidine-3,3'-diglycollic acid and 4,4'-diamino-stilbene-2,2'-disulfonic acid.

Another method of forming the disazo or polyazo amines useful in the invention involves the use in the above-described processes of primary aromatic amines or diamines containing azo groups. Among the useful primary aromatic amines or diamines containing azo groups are 4-aminoazobenzene-4'-sulfonic acid, 4'-amino-2'-methylphenylazo-2-naphthalene-4,8-disulfonic acid and 4-amino-3-methoxy-2-methyl-4'-nitro-2'-sulfoazobenzene.

Another method of obtaining the primary amino colorants of the azo series useful in the invention involves coupling a coupling component, which optionally contains an amino group, with a diazonium compound which contains an amino group, either the coupling component or the diazonium compound of both containing at least one ionogenic solubilizing group. Such diazonium compounds may be obtained by conventional methods involving the diazotisation of the aromatic primary amines containing a second amino group. Suitable aromatic primary amines include p-phenylenediamine, 1,4-phenylenediamine-2-sulfonic acid, 1,4-phenylenediamine-2-carboxylic acid and 1,4-diaminonaphthalene-2-sulfonic acid. Suitable coupling components which may be used in this manner include those listed hereabove and also β-naphthol, 2-naphthol-6- or -7-sulfonic acid, 2-naphthol-3,6- or -6,8-disulfonic acids, 1-naphthol-4-sulfonic acid, 1-phenyl-3-methyl-5-pyrazolone, 1 - (4-sulfophenyl)-3-methyl-5-pyrazolone, 1 - (2,5-dichloro-4-sulfophenyl)-3-methyl-5-pyrazolone, 2-benzoylamino-5-naphthol-7-sulfonic acid, 1-benzylamino- 8-naphthol-3,6- or -4,6-disulfonic acids, acetoacetanilide and acetoacet-2-methoxyanilide-5-sulfonic acid.

Alternatively, suitable primary amino colorants of the azo series are made by treating an azo or polyazo compound containing at least one ionogenic solubilizing group and also containing acylamino groups, with aqueous acid or aqueous alkali in order to cause hydrolysis of the acylamino groups. Such azo or polyazo compounds may be obtained from aromatic primary amines or coupling components containing acylamino groups. Suitable aromatic primary amines, in addition to the acylaminoarylamines mentioned above include, but are not limited to, 4 - amino-1-acetylamino - naphthalene-6-sulfonic acid, 4-amino-4'-acetylaminostilbene-2'-disulfonic acid, and 4-amino-4'-acetylaminobiphenyl-3-sulfonic acid. Suitable coupling components include 2-acetylamino-5-naphthol-7-sulfonic acid, 2-acetylamino-8-naphthol-6-sulfonic acid, and 1 - acetylamino-8-naphthol-3,6- and -4,6-disulfonic acids.

A further method of making the colorants of the azo series is to treat an azo or polyazo compound containing at least one ionogenic solubilizing group and also containing at least one nitro group attached to an aromatic ring, with a reducing agent such as sodium sulphide, sodium hydrosulphide or sodium di- or polysulphides known to be capable of reducing aromatic nitro compounds to the corresponding amino compound.

Useful colorants of the anthraquinone series are those containing a free amino group or an amino group as a substitutent in an alkylamino or arylamino group attached to an alpha position of the anthraquinone nucleus and also containing at least one ionogenic solubilizing group. Suitable aminoanthraquinones include 1-amino-4-(4-aminoanilino)anthraquinone-2,3-disulfonic acid and the corresponding 2,3',5 and 2,3',6-trisulfonic acids, 1-amino - 4 - (4' - amino-4-benzoylaminoanilino)anthraquinone-2,3-disulfonic acid and the corresponding 2,3',5-trisulfonic acid, 1 - amino-4-[4-(4 - aminophenylazo)anilino]anthraquinone-2,2'',5-trisulfonic acid, 1-amino-4-(4'-amino - 3' - carboxyanilino)anthraquinone-2,5-disulfonic acid, 1 - amino-4-(3'-aminoanilino)anthraquinone-2,4',5-trisulfonic acid and the corresponding 2,4'-disulfonic acid, 1-amino-4-[4'-(4'' - aminophenyl)anilino]anthraquinone-2,3'',5-trisulfonic acid, 1-amino - 4 - (4'-methylamino)anilinoanthraquinone-2,3-disulfonic acid, 1-amino-4-(4'-n-butylamino)anilinoanthraquinone-2-,3' - disulfonic acid, 1 - amino - 4-(4'-methylamino-3'-carboxyanilino)-2-sulfonic acid and 1-amino-4-(3'-beta-hydroxyethylamino)-anilinoanthraquinone-2,5-disulfonic acid, 1 - (4'-aminoanilino)anthraquinone-2,3'-disulfonic acid and 1-amino-4-(4' - amino-2'-methoxyanilino)anthraquinone-2,3'-disulfonic acid.

The above primary amines of the anthraquinone series can be made from anthraquinone compounds containing a halogen atom or a nitro group attached to the appropriate alpha-position of the anthraquinone nucleus or from the leuco derivative of a 1,4-dihydroxy-, -diamino- or aminohydroxy-anthraquinone by interacting the appropriate anthraquinone compound with at least one mole of an aliphatic or aromatic diamine. The starting materials are selected to provide at least one ionogenic solubilizing group on the anthraquinone nucleus or on the aliphatic or aromatic diamine. Alternatively, an amino anthraquinone compound, optianally carrying one or more ionogenic solubilizing groups, may be treated with a sulfonating agent, for example, sulfuric acid, chlorosulfonic acid or oleum, in order to introduce one or more sulfonic acid groups.

Colorants of the phthalocyanine series useful in making the dyestuffs of the invention are those containing at least one ionogenic solubilizing group and at least one amino group. The amino group may be attached directly to the benz-rings of the phthalocyanine nucleus or it may be attached through a divalent bridging radical, for example, -phenylene-, -CO-phenylene-, -SO₂-phenylene-, -NH-phenylene-, -S-phenylene-, -CH₂O-phenylene-, -CH₂-phenylene-, -SCH₂-phenylene-, -SO₂CH₂-phenylene-, -SO₂NR - phenylene-CH₂-, -SO₂NR - arylene-, -NRCO-phenylene-, -NRSO₂-phenylene-, -SO₂O-phenylene-, -CH₂-, -CH₂NR-phenylene-, -CH₂NHCO-phenylene-, -SO₂NR- alkylene-, -CH₂NR - alkylene-, -CONR - phenylene-CH₂-, -CONR-arylene-, -SO₂- and -CO-. In the above diavlent bridging radicals, R stands for hydrogen.

Specific amino phthalocyanines which may be used in the invention include, but are not limited to, copper phthalocyanine - 4 - N-(4-amino - 3 - sulfophenyl)sulfonamide-4',4'',4'''-trisulfonic acid, cobalt phthalocyanine-4,4' - di-N-(3'-amino-4'-sulfophenyl)carbonamide-4'', 4'''-dicarboxylic acid and copper-4-(4-amino-3-sulfobenzoyl)-phthalocyanine. Also useful are mixtures of amino phthalocyanines such as approximately equal parts of copper phthalocyanine - N-(4-amino-3-sulfophenyl)-sulfonamide disulfonic acid and copper phthalocyanine bis-[N-(4-amino-3-sulfophenyl)sulfonamide] disulfonic acid.

The aminophthalocyanines which contain a sulfonic acid group can be made by the sulfonation of known phthalocyanines containing primary amino groups or by synthesis from mixtures of phthalic acid derivatives and sulfonated phthalic acid derivatives.

The aminophthalocyanines which contain the divalent bridging radicals referred to hereabove are made by heating together suitable derivatives of sulfonated phthalic acid and substituted phthalic acids by conventional methods, e.g., by heating together a mixture of 4-sulfophthalic anhydride, urea, cupric chloride and ammonium molybdate in o-dichlorobenzene at about 150° C.

Useful colorants of the nitro series include the sulfonic acid derivatives of substituted diphenylamines and phenylnaphthylamines such as 2,4-dinitro-4'-aminodiphenylamine-3'-sulfonic acid, 2 - nitro-3'-amino-4-'-carboxydiphenylamine-4-sulfonic acid, 2-nitro-4'-(p-aminoanilino)-diphenylamine-3,4-disulfonic acid and 1,5-dinitro-2,6-bis-(4-amino-3-sulfoanilino)naphthalene. These sulfonic acid derivatives are conveniently made by the reaction of the appropriate substituted o-nitrochloro-benzene or -naphthalene with the appropriately substituted diamine (at least one of the compounds containing a sulfonic acid group) in aqueous or alcoholic media in the presence of an acid-binding agent, such as calcium carbonate, at a temperature of about 100° C.

In preparing the dyestuffs of the invention, the desired primary amine of the azo, anthraquinone, phthalocyanine or nitro series is reacted with urea and formaldehyde, as shown hereunder, to form a triazinone.

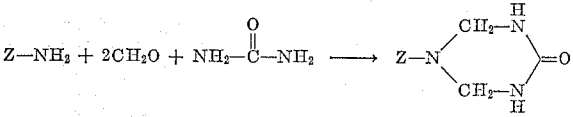

Z in the above equation has the value given aforesaid. Conveniently, the reaction is accomplished by adding, to one mole of the amine in aqueous solution, at least two moles of neutralized aldehyde and at least one mole of urea at a temperature of about 5–15° C. The reaction mixture is then heated to an elevated temperature, conveniently on a steam bath, to form the triazinone intermediate. The intermediate is recovered from solution by vacuum evaporation or by precipitation with an inorganic salt, such as sodium chloride. The triazinone is then dissolved in neutralized formalin containing at least two moles of formaldehyde. The desired hydroxymethyl-substituted triazinone dyestuff, formed according to the following equation, is recovered by vacuum evaporation or precipitation using an inorganic salt.

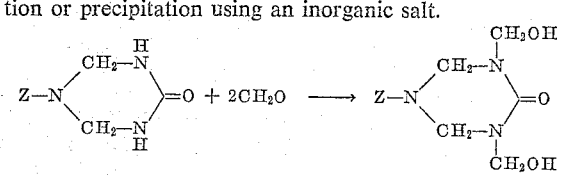

In forming the hydroxymethyl-substituted triazinone dyestuffs, it is preferable to carry out the reaction at a temperature of 20° C. or above and to isolate the new dyestuff from the aqueous solution at a pH of from 6 to 8. The resultant dyestuff paste is then dried in the presence of buffering agents suitable for maintaining a pH of about 6.5 to 7.5. Suitable buffering agents include mixtures of sodium dihydrogen phosphate and disodium hydrogen phosphate or of disodium hydrogen phosphate and potassium dihydrogen phosphate.

The new dyestuffs of the invention containing one or more azo groups may be obtained by an alternative process involving coupling a diazonium compound with a coupling component wherein either the diazonium compound or the coupling component, or both, contains at least one ionogenic solubilizing group and either the diazonium compound or the coupling component, or both, has the hydroxymethyl-substituted triazinone ring attached thereto.

In carrying out this alternative process, the coupling is preferably effected at a temperature below about 5° C., conveniently at a temperature between 0 and 5° C., and at as high a pH as is efficient for coupling in order to minimize side reactions.

The new dyestuffs of the invention are especially suited for the coloration of cellulosic textile materials, such as cotton, linen and viscose rayon.

The dyestuffs are applied by treating the textile material in an aqueous solution (which may be a thickened printing paste) of the dyestuff in the presence of an acidic material such as zinc nitrate, alkyl ammonium chloride and ammonium chloride, and the acidic catalyst may be added to the dye bath either prior to, simultaneously with, or after the addition of the dyestuff.

The dyestuff solution may contain commonly used dye bath adjuvants, such as sodium chloride, sodium sulphate, sodium alginate, urea or water-soluble alkyl ethers of cellulose.

The printing paste may contain commonly used adjuvants, such as urea, and thickening agents, e.g., methyl cellulose, starch and locust bean gum and sodium alginate.

Dyeing in the presence of the acidic catalyst preferably is carried out at elevated temperatures, for example, at temperatures between about 60° C. and the boiling point of the dyestuff solution, in order to improve the exhaustion and fixation of the dyestuff.

The textile material printed with printing paste containing an acidic catalyst is preferably heated in order to fix the dyestuff on the textile material.

When the acid catalyst is applied to the textile material before or after the dyestuff, it is preferably applied by treating the fiber with an aqueous solution of the acid catalyst, i.e., a padding technique. The aqueous solutions of acidic agents may also contain the common dye bath adjuvants.

Both the solution of catalyst and dyestuff may be applied at room temperature or at elevated temperatures. The textile material can be dried between the two treatments if desired. Conveniently, dyestuff, catalyst and adjuvants are applied from the same bath. It is preferred to heat cellulosic materials at an elevated temperature, for example, at 120° C. or higher, for a short period of time after application of the dyestuff and acid catalyst to fix the dyestuff on the textile material.

The above techniques may be modified by substituting for the acid catalyst a substance, which on heating generates an acid catalyst. Such substances include alkali metal bicarbonates which on heating yield alkali metal carbonates.

The fastness to washing or subsequent wet processing of the colorations produced using my new dyestuff is improved by a scouring treatment, e.g., applying a hot aqueous solution of soap and sodium carbonate followed by rinsing in hot water prior to drying.

My invention is further illustrated by the following examples:

Example I

A suspension of 4.15 g. (0.0125 mole) of sodium 4'-amino-4-azo-benzene sulfonate (90% pure) in 20 ml. of distilled water is brought to pH 8–8.5 with trisodium phosphate. There is then added 1.9 g. (0.025 mole) of 40% aqueous formaldehyde solution and the mixture is stirred for several hours at ambient temperature. The suspension is treated with 1.5 g. (0.025 mole) of urea dissolved in 10 cc. of water, and the mixture is stirred for 45 minutes at ambient temperature, then on a steam bath for one and three-fourths hours, during which time all solids dissolve. The solution is evaporated to dryness under vacuum to a yellow solid which is stirred for one and one-half hours with 50 cc. of boiling 95% ethanol. After the mixture is chilled, the solid is filtered off, washed with fresh 95% ethanol, and dried. There is obtained 4.6 g. of product. Anal.—Calcd. for $C_{15}HL_4N_5O_4SNa$ (383.4): N, 18.3. Found: N, 17.3.

A solution of 3.8 g. (0.010 mole) of this material in 50 ml. of water is treated with 60 g. (0.80 mole) of 40% aqueous formaldehyde solution. The mixture is held for three hours at 75–80° C., then evaporated to dryness under vacuum. After drying the residue at 110° C. under vacuum, there is obtained 4.0 g. of dye.

Example II

Cotton is padded with a solution of the following composition: 2.0 g. of the dye of Example I, 100 g. of water, 30 g. of a 3% aqueous solution of sodium alginate, and 20 g. of a 1:20 solution of magnesium chloride in water. After drying, the cloth is held for three minutes at 150° C. Following a rinse in hot water, the yellow dyeing is agitated for forty-five minutes at 71° C. in a solution composed of 0.5% soap and 0.2% soda ash. The fastness of the dye to the soaping is much greater than that of the starting material, sodium 4'-amino-4-azobenzene sulfonate.

Example III

At pH 8.2, a suspension of 50 cc. of water and 13.4 g. (0.0125 mole) of the 75% pure product obtained from the alkaline coupling of 2-amino-5-naphthol-7-sulfonic acid with tetrazotized benzidine-2,2'-disulfonic acid, is mixed with 3.8 g. (0.050 mole) of 40% aqueous formaldehyde solution. After stirring the mixture for several hours at ambient temperature, there is added 3.0 g. (0.050 mole) of urea dissolved in 20 cc. of water. The reaction is continued for one hour at ambient temperature, then for two hours at about 90° C. The resulting solution is cooled to room temperature, diluted with 120 g. of 40% aqueous formaldehyde solution, reheated to 70–80° C., and held for four hours. After evaporating the solution to dryness under vacuum, there is obtained a violet dye in excellent yield.

Example IV

The procedure of Example II is followed using 2.0 g. of the dyestuff of Example III. The fastness of the dyeing to soaping is once again much greater than that of the colorant from which the new dyestuff is prepared.

Example V

The procedure of Example III is repeated using 1-phenylazo-2-amino-3,6-naphthalenedisulfonic acid (CI 13340) as a starting material. There is obtained in good yield a red dye.

Example VI

The procedure of Example III is repeated using 1-(4-aminonaphthylazo)-3,6- (and 3,7-)naphthalenedisulfonic acid. There is obtained in good yield a violet dye.

Example VII

The procedure of Example III is repeated using 2-(2- aminonaphthylazo) - 3,5 - dinitrobenzenesulfonic acid. There is obtained in good yield a blue dye.

Example VIII

The procedure of Example III is repeated using as a dyestuff the product p-aminoacetanilide→1-(2-chloro-4-sulfophenyl)-3-methyl-5-pyrazolone, followed by hydrolysis of the acetyl group. There is obtained in good yield an orange dye.

Example IX

The procedure of Example III is repeated using the product o - anisidine→2 - (m - aminophenyl) - 6 - hydroxy-1H-naphth[1,2]-imidazole-8-sulfonic acid as a starting material. There is obtained in good yield a bluish red dye.

Example X

To a solution of 3.0 g. of 40% aqueous formaldehyde solution in 30 ml. of distilled water there is added 0.0025 mole of sodium 1-amino-4-anilino-2-anthraquinone sulfonate. After stirring at room temperature for one-half hour, the mixture is treated with 1.5 g. (0.025 mole) of urea dissolved in 10 ml. of water. Another 2.6 g. of formaldehyde solution is added for a total of 5.6 g. (0.075 mole). The mixture is stirred for one hour at room temperature, then heated on a steam bath for two hours, whereupon another 3.7 g. of 40% aqueous formaldehyde solution is added. After stirring overnight at ambient temperature, all solids have dissolved. By evaporating to dryness under vacuum, there is obtained a blue dye in excellent yield.

Example XI

The procedure of Example II is followed using 2.0 g. of the dyestuff of Example X. The fastness of the dyeing to soaping is once again much greater than that of the colorant from which the new dyestuff is prepared.

Example XII

A suspension of 0.0625 mole of sodium 1,4-diaminoanthraquinone-2-sulfonate in 20 ml. of distilled water is brought to pH 8 to 8.5 with trisodium phosphate. There is then added 1.9 g. (0.025 mole) of 40% aqueous formaldehyde solution and the mixture is stirred for several hours at ambient temperature. The suspension is treated with 1.5 g. (0.025 mole) of urea dissolved in 10 cc. of water, and the mixture is stirred for 45 minutes at ambient temperature, then on a steam bath for one and three-fourths hours, during which time all solids dissolve. The solution is evaporated to dryness under vacuum to a yellow solid which is stirred for one and one-half hours with 50 cc. of boiling 95% ethanol. After the mixture is chilled, the solid is filtered off, washed with fresh 95% ethanol, and dried. Anal.—Calcd. for $C_{15}H_{14}N_5O_4SNa$ (383.4): N, 18.3. Found: N, 17.3.

A solution of 0.0050 mole of the material so obtained is prepared with 50 ml. of water. The solution is treated with 60 g. (0.80 mole) of 40% aqueous formaldehyde solution. The mixture is held for three hours at 75–80° C., then evaporated to dryness under vacuum. The product is obtained in very good yield after drying the residue at 110° C. under vacuum.

Example XIII

The procedure of Example II is followed using 2.0 g. of the dyestuff of Example XII. The fastness of the dyeing to soaping is once again much greater than that of the colorant from which the new dyestuff is prepared.

Example XIV

The procedure of Example XII is repeated using 1 - hydroxy - 4 - (p - aminoanilino)anthraquinone - 2-sulfonic acid as a starting material. There is obtained in good yield a reddish blue dye.

Example XV

The procedure of Example XII is repeated using 2-(1-aminoanthraquinonoxy)benzene sulfonic acid as a starting material. There is obtained in good yield a red dye.

Example XVI

The procedure of Example XII is repeated using 1-amino-4-thiophenoxy-2-anthraquinonesulfonic acid as a starting material. There is obtained in good yield a violet dye.

Example XVII

The procedure of Example XII is repeated using 1,4-diamino-4,8-dihydroxy-3,7-anthraquinone disulfonic acid as a starting material. There is obtained in good yield a blue dye.

Example XVIII

The procedure of Example XII is repeated using 1,1'-iminobis-(4-aminoanthraquinone)-x,x'-disulfonic acid as a starting material. There is obtained in good yield a blue-gray dye.

Example XIX

A suspension of 0.0125 mole of copper phthalocyanine-4 - N - (4 - amino - 3 - sulfonphenyl)sulfonamido-4',4'',4'''-trisulfonic acid in 25 ml. of distilled water is brought to pH 8 to 8.5 with trisodium phosphate. There is then added 0.025 mole of 40% aqueous formaldehyde solution and the mixture is stirred for several hours at ambient temperature. The suspension is treated with 0.025 mole of urea dissolved in 10 ml. of water and the mixture is stirred for forty-five minutes at ambient temperature then on a steam bath for one and three-fourths hours, during which time all solids may dissolve. The solution is evaporated to dryness under vacuum to a solid which is stirred for one and one-half hours with 50 ml. of boiling 95% ethanol. After chilling the mixture, the solid is filtered, washed with fresh 95% ethanol and dried.

A solution of 0.010 mole of this material in 50 ml. of water is treated with 60 g. (0.80 mole) of 40% aqueous formaldehyde solution. The mixture is held for three hours at 75–80° C. and evaporated to dryness under vacuum to give a blue dye in very good yield.

Example XX

The procedure of Example II is followed using 2.0 g. of the dyestuff of Example XIX. The fastness of the dyeing to soaping is once again much greater than that of the colorant from which the new dyestuff is prepared.

Example XXI

A mixture of 0.0125 mole of the sodium salt of 3-sulfo-4-amino-2',4'-dinitrodiphenylamine and 25 ml. of distilled water is brought to pH 8 to 8.5 with trisodium phosphate. There is then added 0.0375 mole of 40% formaldehyde solution and the mixture is stirred for several hours at ambient temperature. The suspension is treated with 0.025 mole of urea dissolved in 10 ml. of water and the mixture is stirred for 45 minutes at ambient temperature, then on a steam bath for one and three-fourths hours, during which time all solids may dissolve. The solution is evaporated to dryness under vacuum to a solid which is stirred for one and one-half hours with 50 ml. of boiling 95% ethanol. After chilling the mixture, the solid is filtered, washed with fresh 95% ethanol and dried.

A solution of 0.010 mole of this material in 50 ml. of water is treated with 60 g. (0.80 mole) of 40% aqueous formaldehyde solution. The mixture is held for three hours at 75–80° C. and evaporated to dryness under vacuum to give a blue dye in very good yield.

Example XXII

The procedure of Example II is followed using 2.0 g. of the dyestuff of Example XXI. The fastness of the dyeing to soaping is once again much greater than that of the colorant from which the new dyestuff is prepared.

I claim:
1. A dyestuff of the formula:

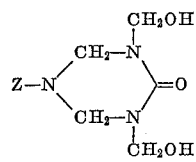

wherein Z is a water-soluble dyestuff moiety selected from the group consisting of azo, anthraquinone, phthalocyanine and nitro, the nitrogen atom of the triazinone ring connected to the Z moiety being directly linked to a nuclear carbon atom when Z is an azo moiety, and said Z moiety containing at least one ionogenic solubilizing group.
2. A dyestuff of claim 1, wherein Z is azo.
3. A dyestuff of claim 1, wherein Z is anthraquinone.
4. A dyestuff of claim 1, wherein Z is phthalocyanine.
5. A dyestuff of claim 1, wherein Z is nitro.

References Cited in the file of this patent

UNITED STATES PATENTS 3,035,942    Cooke et al. _____ May 22, 1962
3,072,524    Long et al. _____ Jan. 8, 1963

OTHER REFERENCES

"Chemical & Engineering News," Feb. 15, 1960, page 59.